(12) United States Patent
So et al.

(10) Patent No.: US 9,774,995 B2
(45) Date of Patent: Sep. 26, 2017

(54) LOCATION TRACKING BASED ON OVERLAPPING GEO-FENCES

(71) Applicant: Microsoft Corporation, Redmond, WA (US)

(72) Inventors: Alisa So, Mill Creek, WA (US); Peter Eberhardy, Seattle, WA (US); Rubaiyat Khan, Redmond, WA (US); Abigail Welbom, Redmond, WA (US); Hong Lin, Bellevue, WA (US); Daniel Larsen, Kirkland, WA (US); Daniel Stiner, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 47 days.

(21) Appl. No.: 14/274,511

(22) Filed: May 9, 2014

(65) Prior Publication Data

US 2015/0327015 A1 Nov. 12, 2015

(51) Int. Cl.
*H04W 4/02* (2009.01)
*G01S 5/02* (2010.01)
*G08B 21/02* (2006.01)
*H04W 60/04* (2009.01)

(52) U.S. Cl.
CPC ........... *H04W 4/022* (2013.01); *G01S 5/0294* (2013.01); *G08B 21/0272* (2013.01); *G08B 21/0277* (2013.01); *H04W 4/027* (2013.01); *H04W 4/028* (2013.01); *H04W 60/04* (2013.01)

(58) Field of Classification Search
CPC .................................................... H04W 4/022
See application file for complete search history.

(56) References Cited

U.S. PATENT DOCUMENTS

| 8,284,748 | B2 | 10/2012 | Borghei | |
|---|---|---|---|---|
| 8,536,999 | B2 | 9/2013 | Holcman et al. | |
| 2010/0318288 | A1* | 12/2010 | Korn ...................... | G01C 21/00 701/533 |
| 2011/0153143 | A1 | 6/2011 | O'Neil et al. | |
| 2011/0178811 | A1 | 7/2011 | Sheridan | |
| 2011/0250901 | A1* | 10/2011 | Grainger ............... | H04W 64/00 455/456.1 |

(Continued)

FOREIGN PATENT DOCUMENTS

EP 2672739 A1 12/2013

OTHER PUBLICATIONS

"Glympse", Published on: May 5, 2014 Available at: https://www.scientiamobile.com/documents/case_studies/glympse.pdf.

(Continued)

*Primary Examiner* — Mazda Sabouri
(74) *Attorney, Agent, or Firm* — Perkins Coie LLP

(57) ABSTRACT

A system for controlling a device to track the location of the device is provided. The system identifies an initial location of the device. The system then identifies a plurality of areas having different sizes. Each area encompasses the identified location. For each of the areas, the system registers the area with a location provider to receive a notification when the location provider detects that the device has left the area. Upon receiving a notification that the device has left an area, the system may repeat the process of identifying the location and the areas and registering the areas to continue tracking the location of the device.

25 Claims, 10 Drawing Sheets

(56) References Cited

U.S. PATENT DOCUMENTS

| | | |
|---|---|---|
| 2012/0078501 A1 | 3/2012 | Haleem |
| 2012/0115512 A1* | 5/2012 | Grainger .............. G01S 5/0257 455/456.3 |
| 2012/0177010 A1* | 7/2012 | Huang .................. H04W 4/021 370/335 |
| 2012/0309409 A1* | 12/2012 | Grosman .......... H04M 1/72572 455/456.1 |
| 2013/0045753 A1 | 2/2013 | Obermeyer et al. |
| 2013/0099977 A1* | 4/2013 | Sheshadri ............. H04W 4/022 342/450 |
| 2013/0176869 A1 | 7/2013 | Finlow-Bates et al. |
| 2013/0178233 A1 | 7/2013 | McCoy et al. |
| 2013/0225196 A1 | 8/2013 | James et al. |
| 2013/0238700 A1 | 9/2013 | Papakipos et al. |
| 2013/0288718 A1 | 10/2013 | MacGougan et al. |
| 2013/0316725 A1* | 11/2013 | MacGougan ......... H04W 4/001 455/456.1 |
| 2013/0324166 A1 | 12/2013 | Mian et al. |
| 2014/0045516 A1 | 2/2014 | Turgman et al. |
| 2015/0031388 A1* | 1/2015 | Chatterjee ............. H04W 4/021 455/456.1 |
| 2015/0181382 A1* | 6/2015 | McDonald ............ H04W 4/021 455/456.3 |

OTHER PUBLICATIONS

"Life360—FAQs", Published on: Aug. 15, 2013 Available at: https://www.life360.com/faqs/.

International Search Report and Written Opinion Issued in PCT Patent Application No. PCT/US2015/029133, mailed: Jul. 23, 2015, 12 Pages.

"International Preliminary Report on Patentability Issued in PCT Application No. PCT/US2015/029133," Mailed Date: Apr. 26, 2016, 5 Pages.

* cited by examiner

LOCATION TRACKING BASED ON OVERLAPPING GEO-FENCES

BACKGROUND

Many portable devices such as smartphones and tablets have a location provider that provides information indicating the current location of the device. These location providers may use a variety of techniques for determining the location of the device. These techniques include Bluetooth, Wi-Fi, cellular, and satellite techniques. The techniques may use proximity information such as the location of a single device (e.g., cell tower) or may use triangulation based on the location of multiple devices. Bluetooth techniques use nearby devices to determine the location of the device. Wi-Fi techniques use available wireless access points such as those that comply with the IEEE 802.11 standard to determine the location of the device. Cellular techniques use nearby cellular towers to determine the location of the device. Satellite techniques use a satellite navigation system to triangulate the location of the device. Satellite navigation systems include the Global Positioning System ("GPS") operated by the United States government and the Global Navigation Satellite System ("GLONASS") operated by the Russian government. Satellite techniques typically provide the most accurate location information (also referred to as fine-grained location information) but consume a relatively high amount of power when doing so (e.g., high-power techniques). Wi-Fi and cellular techniques use a relatively low amount of power (low-power techniques) but typically provide less accurate location information (also referred to as coarse-grained location information) than satellite techniques. Bluetooth techniques are both very accurate and low-power, but their range (e.g., theoretically up to 100 meters) is very short.

The location providers of these portable devices are typically provided by the underlying operating system (e.g., Windows, Android, and iOS). Applications executing on the portable devices interface with the application programming interface ("API") of the location provider to track the location of the device. The location providers typically provide a range of location services. These location services may include a significant-change location service, a region-monitoring location service, and a standard location service. When a location provider provides to an application a notification of a change in the location of the device, it reports a location and an accuracy. The reported location may be specified using longitude and latitude. The reported accuracy is a distance from the reported location that, with a high degree of confidence (e.g., 0.95), the device is within. If the application is asleep when the location provider detects a change in location, the operating system may wake that application so that the application can process the notification of the change.

A significant-change location service typically provides notification to an application when the location of the device has changed significantly. The significant-change location service may define what amount of change in distance corresponds to a "significant" change based on various factors such as the speed of the device (i.e., how fast the device is moving). A significant-change location service may consume a relatively small amount of power by using Wi-Fi or cellular techniques to the extent possible. For example, an application that displays information on nearby restaurants may only need to update the information based on significant changes in location of the device. Such an application would register to receive notifications of significant changes in location and then update the nearby restaurant information in response to notifications from the significant-change location service.

A region-monitoring location service typically provides notification to an application when the location of the device has crossed a boundary of a region (i.e., entering or exiting the region). Such a region is also known as a geo-fence. The region-monitoring location service allows an application to define regions for monitoring by specifying, for example, a location and a radius around that location. After the application registers the regions with the region-monitoring location service, the region-monitoring location service tracks the location of the device, typically using a low-power technique. When the region-monitoring location service detects that the device has crossed a boundary of a defined region, the region-monitoring location service notifies the application of that crossing. For example, an application may define a region around each location of a coffee shop so that the application can be notified when a user of the device is near a coffee shop and then alert the user that the coffee shop is nearby.

A standard location service typically provides notification to an application when the location of the device has moved by more than a certain distance based on a desired accuracy of the location. The standard location service allows an application to define the desired accuracy and distance. The accuracy indicates just how precise of a location is desired. The distance indicates that the application desires to receive notifications whenever the device moves by that distance. For example, an application that provides real-time directions for driving may desire an accuracy of within 20 meters and a distance of 10 meters. In contrast, an application that provides information on nearby restaurants may desire an accuracy of 1,000 meters and a distance of 2,000 meters.

To balance the need for accuracy in location information with the need to conserve power in a device (e.g., battery power in a smartphone), an application can select the location service that is likely to be the best at achieving its desired balance. Although the selected location service may be the best of the location service provided by the device at achieving the desired balance, the underlying operating system typically does not guarantee that the selected location service will achieve the desired balance and the balance that is actually achieved may be very different from the desired balance.

SUMMARY

In some embodiments, a system for controlling a device to track the location of the device is provided. The system identifies an initial location of the device. The system then identifies a plurality of areas having different sizes, each area encompassing the identified location. For each of the areas, the system registers the area with a location provider to receive a notification when the location provider detects that the device has left the area. Upon receiving a notification that the device has left an area, the system may repeat the process of identifying the current location of the device, identifying the areas, and registering the areas to continue tracking the location of the device.

In some embodiments, a device for tracking its own location is provided. The device includes a processor and a computer-readable storage medium storing computer-executable instructions that initialize tracking of the device. The device initializes the tracking by identifying a location of the device and identifying circular areas of different radiuses. Each circular area has a center that is derived from the identified location, and at least one of the radiuses may be based on the speed of travel of the device. The device also registers the circular areas with a location provider of the device to receive notification that the location provider has detected that the device has crossed the boundary of a circular area. The medium also stores instructions that, after the tracking is initialized, upon receiving a notification that the location provider has detected that the device has crossed a boundary, the device re-initializes tracking of the device so that the tracking is based on circular areas derived from a new location of the device.

In some embodiments, a method in a device for tracking a location of the device is provided. The method identifies the location of the device. The method then defines multiple areas that encompass the identified location. The multiple areas have different sizes. A smaller area allows for detecting fine-grained changes in location, and a larger area allows for detecting larger-grained changes in location, for example, in case the device fails to detect when the device crosses a boundary of the smaller area. After defining the multiple areas, the method repeatedly identifies the location of the device using a low-power technique. When a previously identified location and a newly identified location indicate that the device has crossed a boundary of an area, the method provides a notification that the device has changed location.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
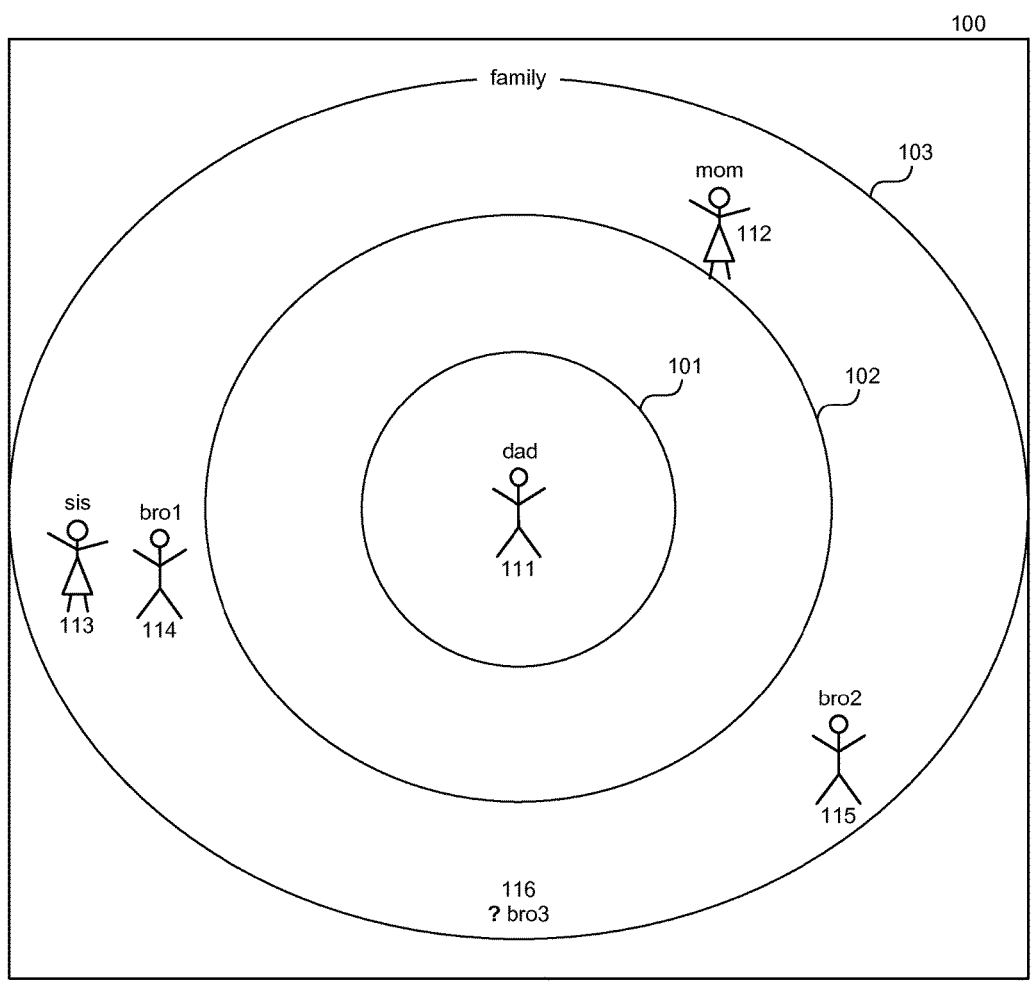
FIG. 1 is a display page that illustrates a map displayed by a group tracking application that uses a location tracking system in some embodiments.

A system for tracking the location of a device using overlapping areas is provided. In some embodiments, a location tracking system of the device that is being tracked uses the location services of a location provider to track the location of the device. The location tracking system initially identifies the location of the device and defines areas having different sizes that encompass the identified location. For example, the location tracking system may define one circular area with a radius of 10 meters and another circular area with a radius of 20 meters that are each centered on the identified location. The location tracking system registers the areas with a region-monitoring location service of the location provider. When the region-monitoring location service detects that the device has crossed the boundary of one of the areas, the region-monitoring location service notifies the location tracking system of that crossing. For example, when the device exits the boundary of the smaller circular area, the region-monitoring location service notifies the location tracking system. Upon receiving notification of the crossing, the location tracking system processes the new location of the device. For example, if the location tracking system is designed to simply record the path of the device, then the location tracking system may store the location and a timestamp. If the location tracking system is designed to provide directions, then the location tracking system may provide the next direction based on the new location. To continue tracking the device, the location tracking system then registers with the region-monitoring location service new areas that overlap the new location of the device. For example, the location tracking system may register circular areas with a radius of 10 and 20 meters that are centered on the new location.

The location tracking system registers multiple areas, each with a different size, with the region-monitoring location service to provide fallback, for example, if the region-monitoring location service fails to detect the device crossing a boundary of a smaller area. The region-monitoring location service may fail to detect a crossing for a variety of reasons. For example, if the device is moving quickly and crosses the boundary of a smaller area before the region-monitoring location service can determine the initial location of the device, then the initial location may already be outside of the smaller area, and that crossing would not be detected. As another example, the location tracking system may identify a current location of the device using a very accurate technique (e.g., a satellite technique) and center the areas on that current location. The region-monitoring location service may, however, use a less accurate technique (e.g., a cellular technique) resulting in the device's initial location again being outside of a smaller area. As another example, the operating system or the region-monitoring location service may throttle notifications if too many are being generated. In such a case, the location tracking system may not be notified of a crossing. By using multiple areas, the location tracking system can help ensure that if the crossing of the boundary of a smaller area is not detected, the location tracking system will at least receive notification when the device crosses the boundary of a larger area. The larger area may serve as a fallback in case the boundary crossing of a smaller area is not detected.

In some embodiments, the location tracking system may define the size of the smaller area based on the needed granularity in location. For example, if the location tracking system would like to know when the device has traveled 10 meters, then the location tracking system may register concentric circular areas with radiuses of 10 meters, 30 meters, and 100 meters. If the region-monitoring location service fails to detect the boundary crossing of the 10-meter circular area or even the 30-meter circular area, then the 100-meter circular area provides a fallback so that the location tracking system will eventually receive a notification if the device crosses the 100-meter circular area, after which the location tracking system will continue its processing.

In some embodiments, the location tracking system may base the size of the circular areas on the speeds of travel for various modes of transportation. For example, the speed of travel for walking may be five kilometers per hour, for bicycling may be 20 kilometers per hour, for city driving may be 40 kilometers per hour, and for highway driving may be 100 kilometers per hour. If the location tracking system does not know the mode of transportation, then the location tracking system may register a circular area for each mode of transportation; for example, the location tracking system may register a circular area of 10 meters for walking, 40 meters for bicycling, 80 meters for city driving, and 200 meters for highway driving. If a person holding the device is walking, then the 10-meter circular area provides the needed granularity, and the 40-meter circular area provides a fallback. If the device is in a vehicle driving in the city, then the region-monitoring location service may fail to detect the crossing of the boundaries of the 10-meter and 40-meter circular areas. If those crossings are detected, then the location tracking system may ignore the notifications of those crossings. In addition, the 200-meter circular area serves as a fallback in case the crossing of the 80-meter circular area is not detected. The location tracking system may also select radiuses based on the current speed at which the device is moving. Thus, the location tracking system may select a smaller radius when the device is known to be traveling slowly.

In some embodiments, the location tracking system may register circular areas that are not concentric. For example, the location tracking system may factor in the direction of travel of the device in selecting the center for a circular area. If the device is traveling west, then the location tracking system may offset the smallest circular area by centering it on a point west of the current location, while still overlapping the current location. The location tracking system may center the larger circular areas on the current location. Also, the location tracking system may use a smaller circular area with the offset. This smaller circular area would still allow the location tracking service to be notified when the device travels a certain distance in the direction of travel and also allow changes in direction to be detected more quickly.

In some embodiments, the location tracking system may base the size of a circular area on the reported accuracy of a reported location of the device. For example, if the location provider reports a location with an accuracy of 1,000 meters, then the location tracking system may register various circular areas assuming that the reported location is accurate and also register a circular area with a radius of 2,000 meters as a fallback. Such a fallback helps ensure that the location tracking service will receive notification of a boundary crossing even if the reported location turns out not to be very accurate.

In some embodiments, the location tracking system may also (e.g., as a fallback) register to receive notifications from a significant-change location service of the location provider. After the location tracking system registers areas with the region-monitoring location service, the location tracking system may go to sleep until a notification in change of location is received. If the region-monitoring location service does not, however, detect a location change, then the location tracking system would never wake up. If the region-monitoring location service does not detect the crossing of a boundary of a registered area, a notification from the significant-change location service will cause the location tracking system to wake up. After waking up, the location tracking system may register new areas based on the current location of the device.

In some embodiments, the location tracking system may also (e.g., as a failsafe) request the operating system to wake up the location tracking system after a timeout period of time. By requesting to be woken up by the operating system, the location tracking system can ensure that it will at least be woken up after the timeout period so that it can identify the current location. Even if the crossings of the boundaries are not detected or the device does not cross any boundaries, the location tracking system will be able to continue its processing. After waking up, the location tracking system may register new areas based on the current location of the device.

In some embodiments, the location tracking system may include a background process that runs in background mode (e.g., with no user interaction) and a foreground process that runs in foreground mode (e.g., with user interaction). To prevent excessive use of a satellite navigation system which might drain the battery, an operating system may restrict access by a background process to the satellite navigation system. For example, the operating system may prohibit a background process from starting the satellite navigation system, but may allow a background process to access an already started satellite navigation system. As another example, an operating system may prohibit access when battery power is low. Whenever the foreground process of the location tracking system is started (e.g., to provide a map based on the current location of the device), the foreground process may initially request that the location provider use the satellite navigation system to establish the current position of the device. In this way, the location tracking system can more accurately assess the current location when a user interacts with the location tracking system.

In some embodiments, a region-monitoring location service may support areas of shapes other than circles, such as rectangular, triangular, oval, or even arbitrarily shaped areas. For example, if the device is traveling in a certain direction, the location tracking system may register a triangular area with one of the vertices centered on the current location and the triangular area oriented in the direction of travel. In such a case, the crossing of a boundary that is adjacent to the vertex centered on the current location may indicate that the device is now traveling in a somewhat different direction. As another example, an elongated rectangular shape oriented in the direction of travel may also be used to detect a turn in the travel path. The location tracking system may register multiple non-circular areas or a combination of circular and non-circular areas. If the region-monitoring location service does not support non-circular areas, then the location tracking system may use multiple circular areas not centered on the current location to detect changes in direction. For example, the location tracking system may use circular areas to approximate the adjacent boundaries of a triangular area. When the location tracking service receives a notification that the device has entered one of the circular areas approximating an adjacent boundary, then the location tracking service may assume that the direction of travel of the device has changed.

In the following, the location tracking system is described as part of a group tracking application that tracks the location of members of a group such as a family. Each member of the group may have a device with the group tracking application. The group tracking application may use a publisher/subscriber model to publish location information to other members of the group. Each member of the group may subscribe to the location information of each other member of the group. When the location tracking system of a device of a member of the group detects a change in location of that device, the group tracking application publishes that location. The locations may be published by sending to a shared service of a server, which in turn sends the notifications to the subscribers. The locations may also be published by sending directly to each subscriber. The locations may be sent via a communication mechanism such as text messaging, the Internet, a Wi-Fi network, and so on. The locations may also only be sent to a subscriber when the tracking application is in the foreground. The group tracking application may also allow a member to request the current location of another member. The group tracking application may display a map showing the current location of each member of the group. As publications of changing locations of other group members are received, the group tracking application may update the map to show the new locations.

The location tracking system may be used with many different types of applications. For example, an advertisement application may provide advertisements or coupons to a user based on the current location of the user. As another example, a co-location application may provide notifications to a user when that user's device is in proximity of the device of another user. The user may then decide to travel to and meet that other user. As another example, a map application may use the location tracking system to automatically shift the map after the user has traveled a certain distance to re-center the map on the new location. As another example, the location tracking system may be used by a tracking device for tracking shipments. When a package is shipped, a tracking device may be attached to or included in the package. The location tracking system can then be used to report changes in the location of the package. Since the location tracking system can operate using relatively low power, the tracking device may be relatively inexpensive and not use much battery power. The location tracking system may also be used to track pets or other animals (e.g., livestock, wild animals, birds of prey, and so on). A tracking device attached to the collar of a pet can publish notifications of changes in the location of the pet.

FIG. 1 is a display page that illustrates a map displayed by a group tracking application that uses a location tracking system in some embodiments. A display page 100 displays the location 111-116 of each group member superimposed on a map, which is not shown. The group tracking application may center the map on the location of the user of the device. In this example, the group is a family with a father, a mother, three brothers, and one sister. The father 111 is illustrated as being in the center of the map, and the mother 112 is illustrated as being just to the northeast of the father. The sister 113 and the brother 114 are illustrated as being to the southwest of the father. The brother 115 is illustrated as being to the southeast of the father. The brother 116 is illustrated as being at an unknown location. For example, the group tracking application may not be currently executing on the device of the brother 116 and thus the location is not being published to the father's device. Superimposed on display page 100 are concentric circular areas 101, 102, and 103. These concentric circular areas illustrate areas that may be registered by the location tracking system to track changes in the location of the father. The location tracking system of the devices of the other family members would register similar concentric circular areas around those family members.

Figure 2:
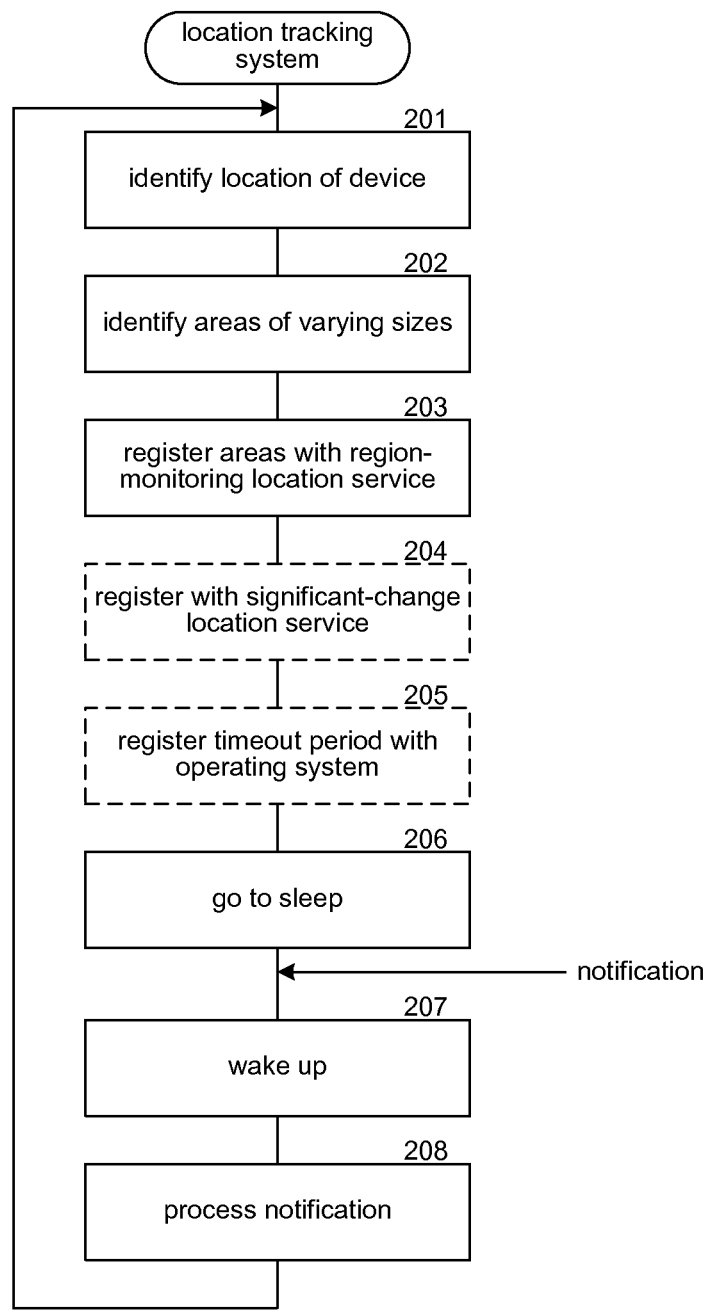
FIG. 2 is a flow diagram that illustrates overall processing of the location tracking system in some embodiments.

FIG. 2 is a flow diagram that illustrates overall processing of the location tracking system in some embodiments. In block 201, the location tracking system identifies the current location of the device. The current location may be identified by requesting the location service to provide the current location using a low-power technique or may be identified from the most recent notification of a change in location. In block 202, the location tracking system identifies areas of varying sizes for tracking the crossing of the area boundaries. In block 203, the location tracking system registers the areas with a region-monitoring location service. In block 204, the location tracking system optionally (as indicated by the dashed line) registers with a significant-change location service to receive notifications of significant changes in the location of the device. In block 205, the location tracking system optionally registers with the operating system a timeout period for receiving a wake-up notification. In block 206, the location tracking system goes to sleep until a notification is received from the region-monitoring location service, the significant-change location service, or the operating system. In block 207, after receiving the notification, the location tracking system wakes up. In block 208, the location tracking system processes the notification, for example, by publishing a notification to other group members or storing the notification to track the path of travel of the device. The location tracking system then loops to block 201 to register new areas based on the current location of the device.

Figure 3:
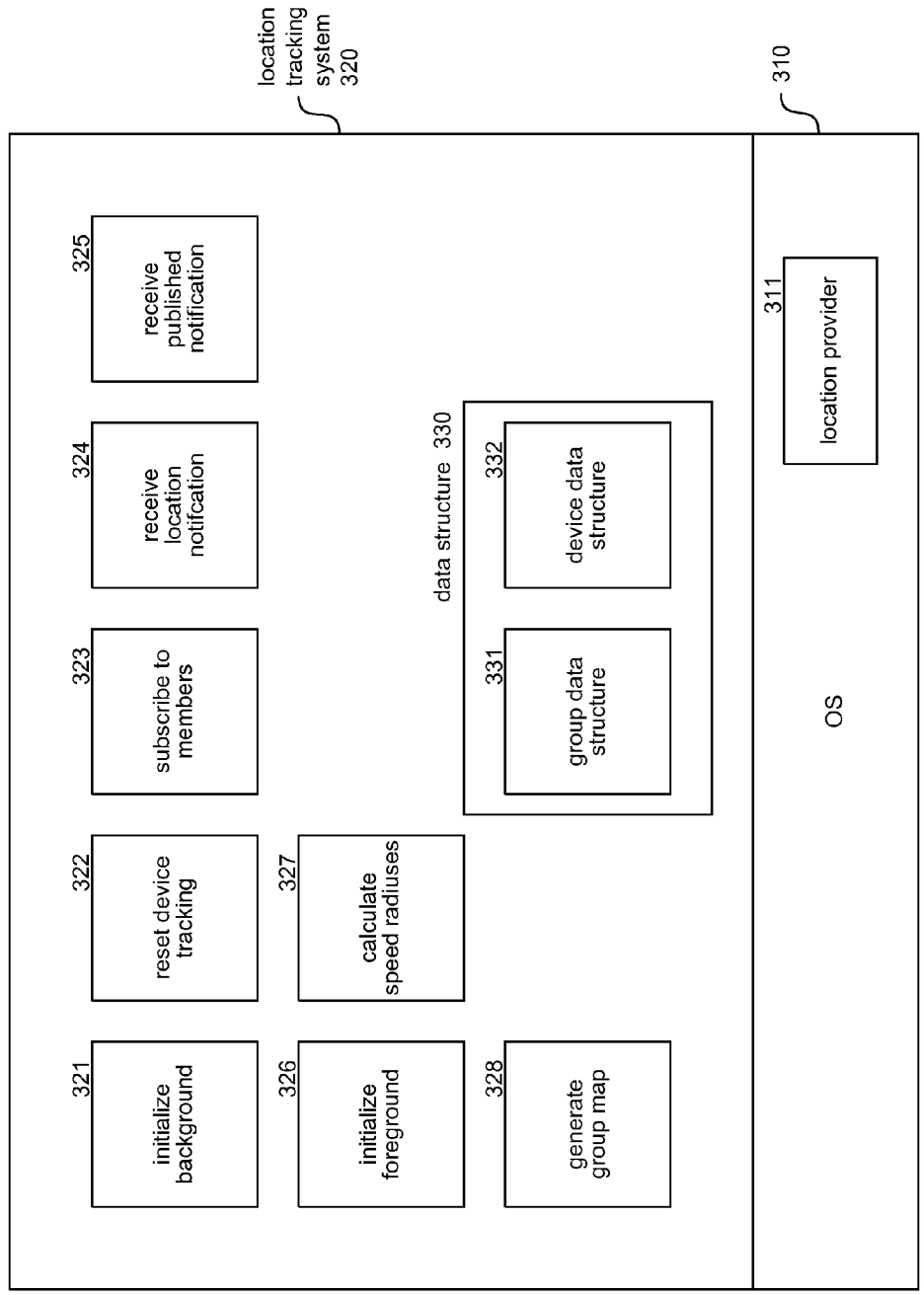
FIG. 3 is a block diagram that illustrates components of the location tracking system in some embodiments.

FIG. 3 is a block diagram that illustrates components of the location tracking system in some embodiments. In this example, the location tracking system 320 is illustrated as providing group tracking capabilities. The location tracking system includes an initialize background component 321, a reset device tracking component 322, a subscribe to members component 323, a receive location notification component 324, a receive published notification component 325, an initialize foreground component 326, a calculate speed radiuses component 327, and a generate group map component 328. The location tracking system also includes data structures 330 that include a group data structure 331 and a device data structure 332. The location tracking system interfaces with an operating system 310 that includes a location provider 311 that provides a region-monitoring location service, a significant-change location service, and a standard location service.

The initialize background component initializes the processing of the location tracking system in background mode. The reset device tracking component registers the areas based on the current device location and goes to sleep. The subscribe to members component sends subscription requests to the devices of other members of the group. The receive location notification component processes location notifications from the operating system when the location tracking system wakes up. The receive published notification component receives location notifications published by other group members. The initialize foreground component initializes the processing of the location tracking system in foreground mode. The calculate speed radiuses component calculates the radiuses of various areas for different modes of transportation. Although not shown, the location tracking system may have components that calculate the radiuses in different ways. For example, one component may calculate a radius based on the size of an office building to detect when a device has left that office building. The generate group map component generates a group map that illustrates the location of the group members. The group data structure contains information about the other group members, including the current location. The device data structure contains location and timestamp information indicating the path of travel of the device.

The computing devices on which the location tracking system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing devices may include desktop computers, laptops, tablets, e-readers, personal digital assistants, smartphones, and gaming devices. The computing devices may access computer-readable media that includes computer-readable storage media and data transmission media. The computer-readable storage media are tangible storage means that do not include a transitory, propagating signal. Examples of computer-readable storage media include memory such as primary memory, cache memory, and secondary memory (e.g., DVD) and include other storage means. The computer-readable storage media may have recorded upon or may be encoded with computer-executable instructions or logic that implements the location tracking system. The data transmission media is used for transmitting data via transitory, propagating signals or carrier waves (e.g., electromagnetism) via a wired or wireless connection.

The location tracking system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the location tracking system may be implemented in hardware using, for example, an application-specific integrated circuit ("ASIC").

Figure 4:
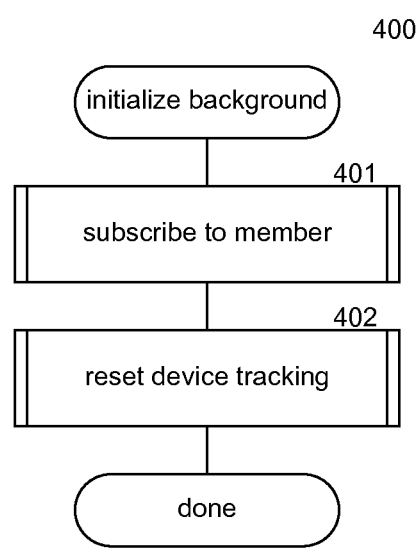
FIG. 4 is a flow diagram that illustrates processing of the initialize background component of the location tracking system in some embodiments.

FIG. 4 is a flow diagram that illustrates processing of the initialize background component of the location tracking system in some embodiments. The initialize background component 400 subscribes to the published location notifications of other group members and starts the location tracking of the device. In block 401, the component invokes the subscribe to members component to subscribe to the location notifications published by other group members. In block 402, the component invokes the reset device tracking component to start tracking this device.

Figure 5:
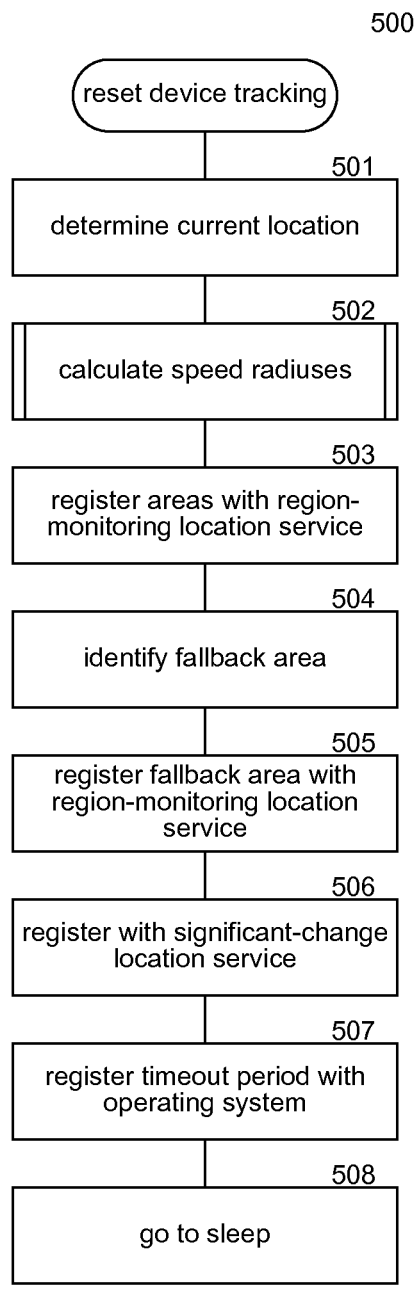
FIG. 5 is a flow diagram that illustrates the processing of a reset device tracking component of the location tracking system in some embodiments.

FIG. 5 is a flow diagram that illustrates the processing of a reset device tracking component of the location tracking system in some embodiments. The reset device tracking component 500 registers areas for receiving notifications of boundary crossings and registers to receive significant-location changes and then goes to sleep. In block 501, the component determines the current location of the device. If the component is executing in the foreground mode, it may use satellite navigation to determine the current location. If in background mode, the component may determine the current location based on the most recent location change notification or may use a non-satellite navigation system. The location may be reported as latitude and longitude along with an accuracy. In block 502, the component invokes the calculate speed radiuses component to determine the radiuses for various circular areas. In block 503, the component registers the areas with the region-monitoring location service. In block 504, the component identifies an area as a fallback, such as an area based on the accuracy of the current location of the device. In block 505, the component registers the fallback area with the region-monitoring location service. In block 506, the component registers with the significant-change location service. In block 507, the component registers a timeout period with the operating system. In block 508, the component goes to sleep if executing in background mode or may return if executing in foreground mode.

Figure 6:
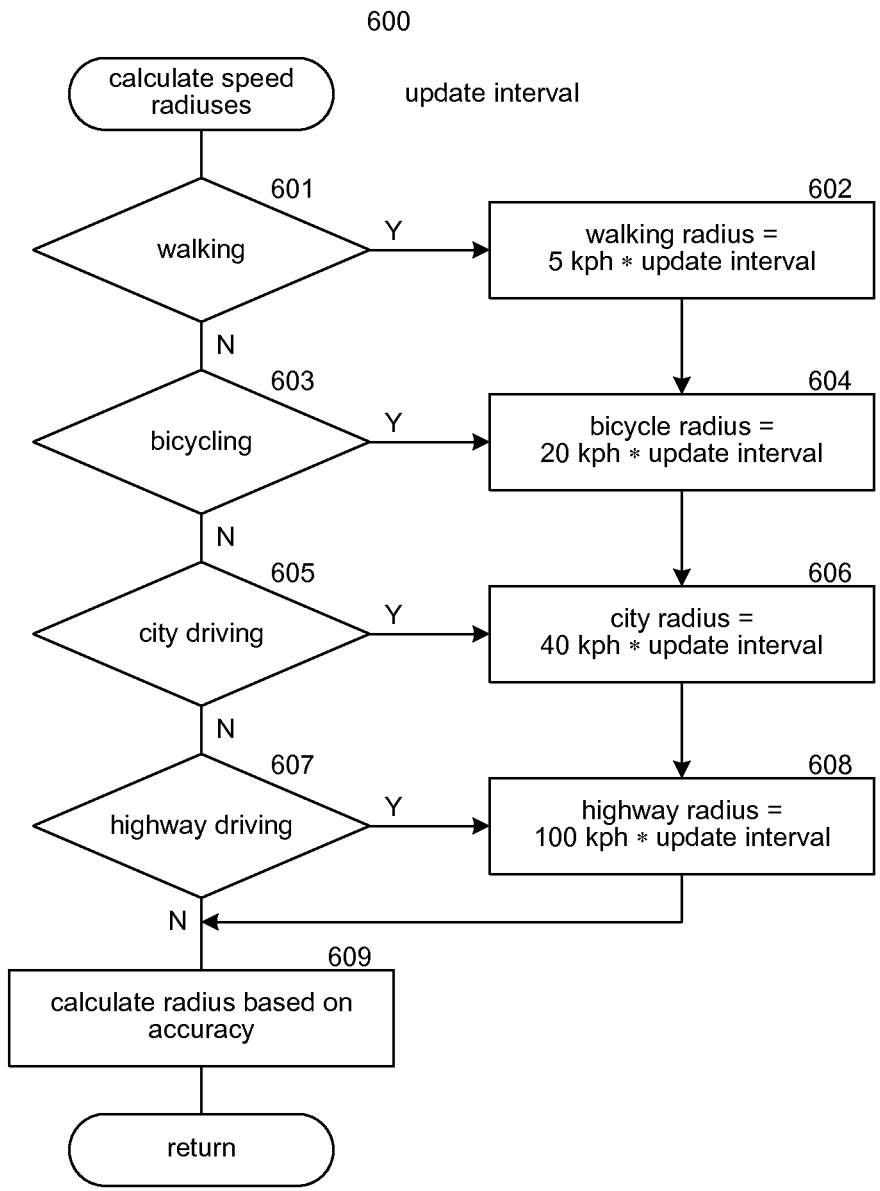
FIG. 6 is a flow diagram that illustrates the processing of a calculate speed radiuses component of the location tracking system in some embodiments.

FIG. 6 is a flow diagram that illustrates the processing of a calculate speed radiuses component of the location tracking system in some embodiments. The component 600 may be passed an update interval indicating the time until the next needed update assuming the device is traveling at a certain speed. In decision block 601, if the mode of transportation is walking, then the component continues at block 602, else the component continues at block 603. In block 602, the component calculates a walking radius and then continues at block 604 to calculate the radiuses for the other modes of transportation. In decision block 603, if the mode of transportation is bicycling, the component continues at block 604, else the component continues at block 605. In block 604, the component calculates a bicycling radius and then continues at block 606 to calculate the radiuses for the other modes of transportation. In decision block 605, if the mode of transportation is city driving, then the component continues at block 606, else the component continues at block 607. In block 606, the component calculates a city driving radius and then continues at block 608 to calculate the radius for the remaining mode of transportation. In decision block 607, if the mode of transportation is highway driving, the component continues at block 608, else the component continues at block 609. In block 608, the component calculates a highway driving radius and continues at block 609. In block 609, the component calculates a radius based on the accuracy as a fallback. The component then returns.

Figure 7:
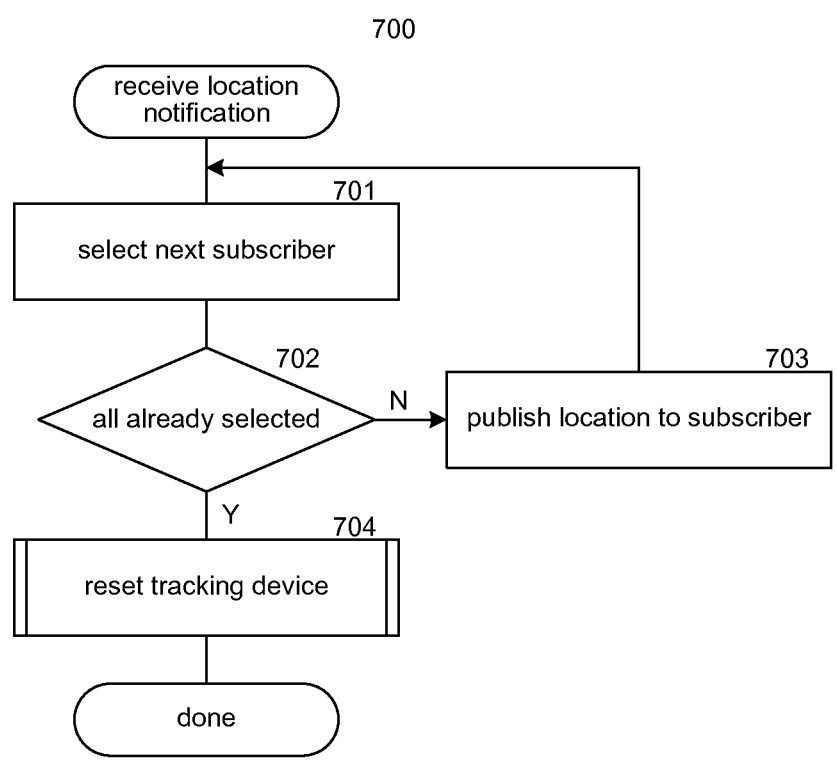
FIG. 7 is a flow diagram that illustrates the processing of a receive location notification component of the location tracking system in some embodiments.

FIG. 7 is a flow diagram that illustrates the processing of a receive location notification component of the location tracking system in some embodiments. The receive location notification component 700 receives a notification of a change in location, publishes the changed location to the subscribers, and then resets the device tracking. In blocks 701-703, the component loops publishing the location information for the device to the subscribers. In block 704, the component invokes the reset device tracking component to start the device tracking based on the current location.

Figure 8:
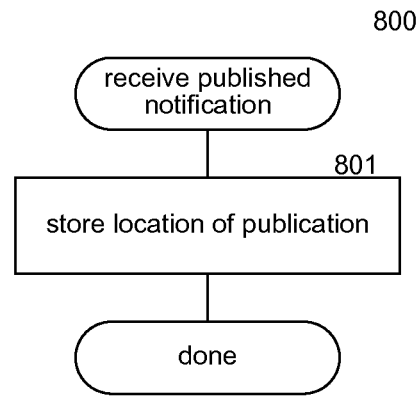
FIG. 8 is a flow diagram that illustrates the processing of a receive published notification component of the location tracking system in some embodiments.

FIG. 8 is a flow diagram that illustrates the processing of a receive published notification component of the location tracking system in some embodiments. The receive published notification component 800 is invoked when a location notification published by another device is received. In block 801, the component stores the location of the publishing device for use by the application using the location tracking system. The component then completes.

Figure 9:
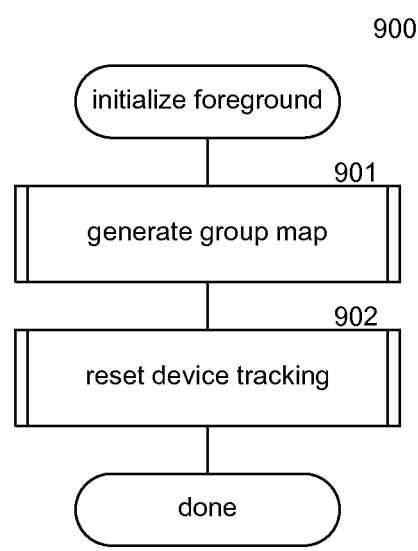
FIG. 9 is a flow diagram illustrating the processing of an initialize foreground component of the location tracking system in some embodiments.

FIG. 9 is a flow diagram illustrating the processing of an initialize foreground component of the location tracking system in some embodiments. The initialize foreground component 900 is invoked when a group tracking application executes in a foreground mode. In block 901, the component invokes the generate group map component to display a map indicating the location of the members of the group. In block 902, the component invokes the reset device tracking component to start tracking the location of the device.

Figure 10:
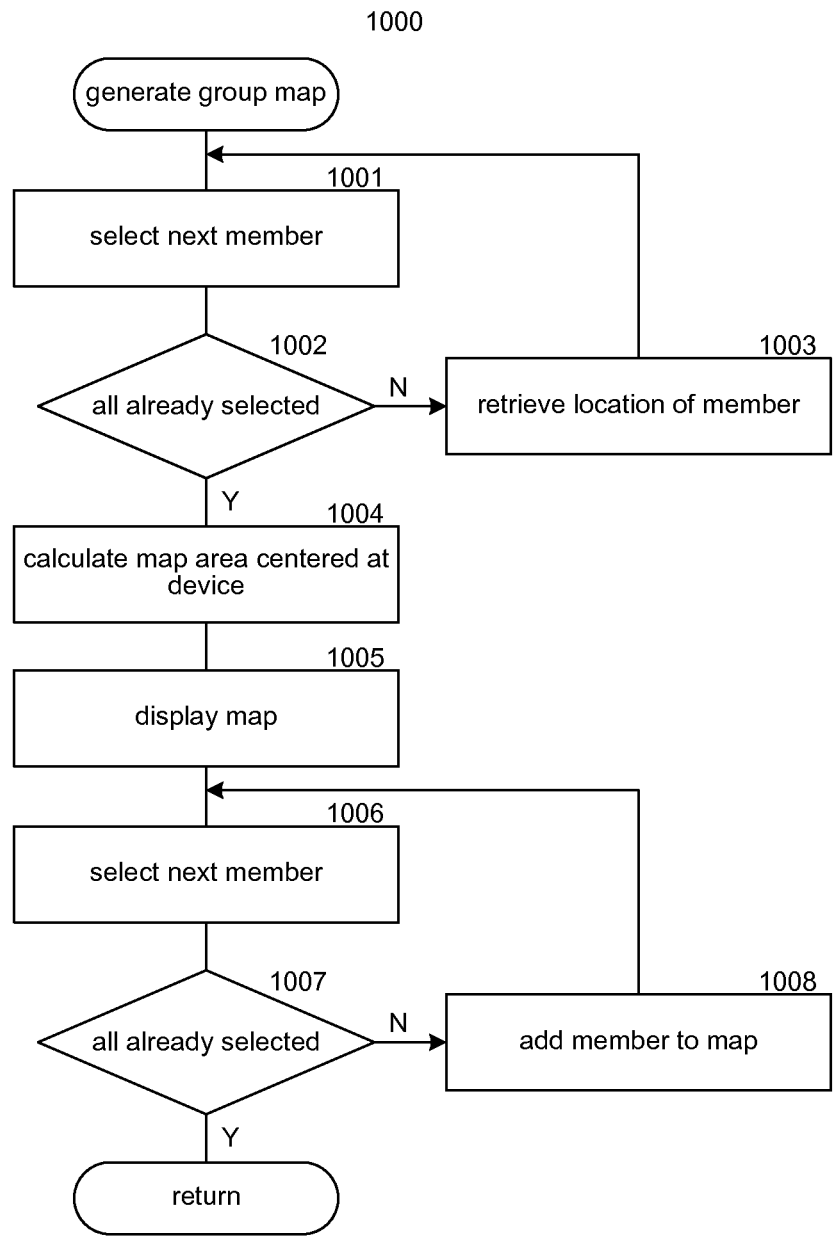
FIG. 10 is a flow diagram that illustrates the processing of a generate group map component of the location tracking system in some embodiments.

FIG. 10 is a flow diagram that illustrates the processing of a generate group map component of the location tracking system in some embodiments. The generate group map component 1000 is invoked to display a map indicating the location of members of a group. In blocks 1001-1003, the component loops retrieving the location of each member of the group. In block 1004, the component calculates a map area centered on the location of the device at a resolution that is sufficient to show the location of each member of the group. In block 1005, the component displays the map. In blocks 1006-1008, the component loops selecting each member and adding the location of the selected member to the map. The component then returns.

Figure 11:
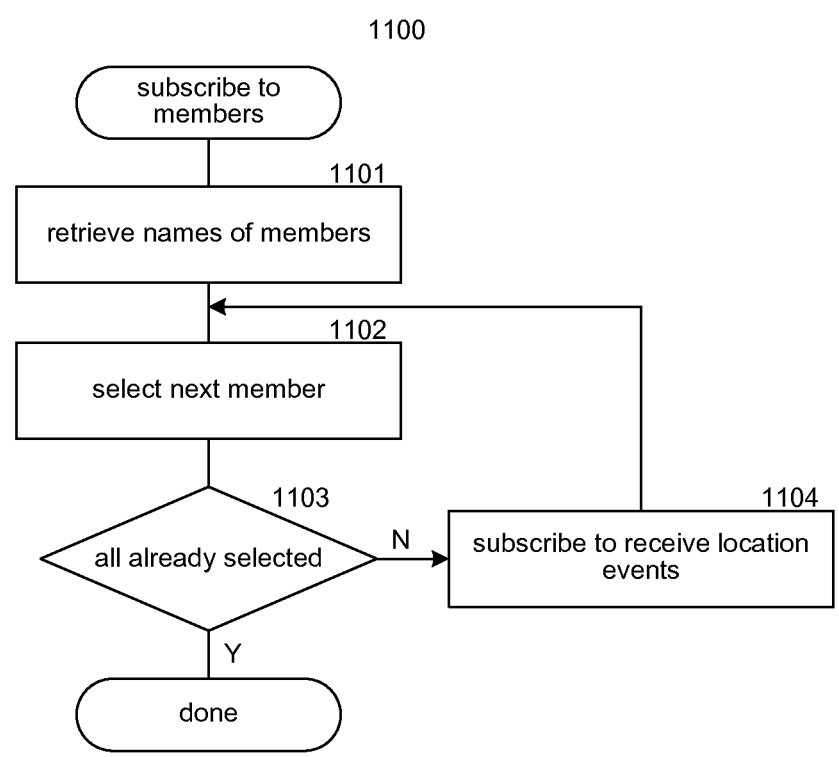
FIG. 11 is a flow diagram that illustrates the processing of a subscribe to members component of the location tracking system in some embodiments.

FIG. 11 is a flow diagram that illustrates the processing of a subscribe to members component of the location tracking system in some embodiments. The subscribe to members component 1100 subscribes to receive publications of changes in location of the members of the group. In block 1101, the component retrieves the names of the members. The component may provide a user interface for receiving the names or other identification information for the members, which is stored in the group data structure for later retrieval. In blocks 1102-1104, the component loops selecting each member and subscribing to receive the location notification of the selected member. The component then returns.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A computer-readable storage medium storing computer-executable instructions for controlling a device to track a location of the device, the computer-executable instructions comprising instructions that:
   identify a location of the device;
   after the location of the device is identified, identify a plurality of first areas that are centered on the identified location, that have different sizes, and that each encompasses all smaller first areas, the first areas including a smaller first area and a larger first area; and
   for each of the identified first areas, register the first area with a location provider to receive a notification when the location provider detects that the device has left the first area;
   upon receiving a notification from the location provider that the device has left the smaller first area, register with the location provider a plurality of second areas centered on a new identified location of the device such that the location provider no longer provides a notification when the location provider detects that the device has left the larger first area; and
   upon receiving a notification from the location provider that the device has left the larger first area, register with the location provider a plurality of second areas centered on a new identified location of the device such that the location provider no longer provides a notification when the location provider detects that the device has left the smaller first area;
   wherein the plurality of areas are registered simultaneously with the location provider so the location provider can detect that the device has left any one of the plurality of areas even though the location provider did not detect that the device left a smaller area.

2. The computer-readable storage medium of claim 1 wherein the areas are concentric circles centered on the location of the device.

3. The computer-readable storage medium of claim 2 wherein the radius of at least one of the circles is based on speed of travel associated with the device.

4. The computer-readable storage medium of claim 2 wherein the radius of at least one of the circles is derived from an accuracy associated with the location of the device as reported by the location provider.

5. The computer-readable storage medium of claim 1, further comprising instructions that register with the location provider to receive a notification of a significant change in the location of the device.

6. The computer-readable storage medium of claim 1, further comprising instructions that set a timeout period so that the location of the device can be identified if the location provider fails to detect that the device has left the area during that timeout period.

7. The computer-readable storage medium of claim 1 wherein the instructions are part of an application that runs in background mode in which access to a satellite navigation system of the device is restricted by an operating system of the device.

8. The computer-readable storage medium of claim 7, further comprising instructions that, when the application enters a foreground mode in which access to the satellite navigation system is not restricted, identify the location of the device using the satellite navigation system.

9. The computer-readable storage medium of claim 1, further comprising instructions that, upon receiving a notification that the location provider has detected that the device has crossed a boundary of an area, repeat the identifying of the location and the areas and registering the areas with the location provider.

10. The computer-readable storage medium of claim 1 wherein the location provider fails to detect that the device crossed a boundary because the registration was not completed after the device exited the area.

11. A device for tracking the location of the device, the device comprising:
    a computer-readable storage medium storing computer-executable instructions that
       initialize tracking of the device by:
          identifying a location of the device;
          identifying circular areas of different radiuses, each circular area with a center derived from the identified location, at least one of the radiuses being based on a speed of travel of the device, the circular areas including a first circular area with a first radius and a second circular area with a second radius, the first radius being smaller than the second radius; and
          registering the circular areas with a location provider of the device to receive notification that the location provider has detected that the device has crossed the boundary of a circular area wherein multiple circular areas are registered with the location provider so that the location provider is enabled to detect the device crossing any of the boundaries of the circular areas;

upon receiving a notification that the location provider has detected that the device has crossed a boundary of the first circular area, re-initialize tracking of the device so that the tracking is based on circular areas derived from a new location of the device; and upon receiving a notification that the location provider as detected that the device has crossed a boundary of the second circular area, re-initialize tracking of the device so that the tracking is based on circular areas derived from a new location of the device; and a processor for executing the computer-executable instructions of the computer-readable storage medium.

12. The device of claim 11 wherein the radius of at least one of the circular areas is derived from an accuracy associated with the identified location.

13. The device of claim 11 wherein the computer-executable instructions further register with the location provider to receive a notification of a significant change in the location of the device and, upon receiving a notification that the location provider has detected a significant change in the location of the device, re-initialize tracking of the device.

14. The device of claim 11 wherein the computer-executable instructions further publish the location of the device so that another device can track the location of the device.

15. A method performed by a device for tracking the location of the device, the method comprising:

initializing tracking of the device by:
identifying a location of the device;
identifying overlapping areas, each area overlapping the identified location of the device, the areas including a first area and a second area; and
registering the areas with a location provider of the device to receive notification that the location provider has detected that the device has crossed the boundary of an area wherein multiple areas are registered with the location provider so that the location provider is enabled to detect the device crossing any of the boundaries of the areas;

upon receiving a notification that the location provider has detected that the device has crossed the boundary of the first area, re-initializing tracking of the device so that the tracking is based on areas derived from a new location of the device; and upon receiving a notification that the location provider as detected that the device has crossed a boundary of the second area without having received a notification that the location provider detected that the device crossed the boundary of the first area even though the device crossed the boundary for the first area, re-initializing tracking of the device so that the tracking is based on areas derived from a new location of the device.

16. A method performed by a device for tracking the location of the device, the method comprising:

registering a first area and a second area with a location provider of the device to receive notification that the location provider has detected that the device has crossed a first boundary of the first area and a second boundary of the second area, wherein the device is at a current location that is within both the first area and the second area;

upon receiving a notification that the location provider has detected that the device has crossed the first boundary, registering with the location provider of the device a new area to receive notification that the location provider has detected that the device has crossed a new boundary of the new area, wherein the device is at a new location that is within the new area; and upon receiving a notification that the location provider has detected that the device has crossed the second boundary without having received a notification that the location provider detected that the device crossed the first boundary even though the device crossed the first boundary, registering with the location provider of the device a new area to receive notification that the location provider has detected that the device has crossed a new boundary of the new area, wherein the device is at a new location that is within the new area.

17. The method of claim 16 wherein the first area and the second area are circular.

18. The method of claim 17 wherein the first area and the second area are centered on the current location of the device and the first area is smaller than the second area.

19. The method of claim 16 wherein the first area is a triangular area with a vertex of the triangular area oriented in direction of travel of the device.

20. The method of claim 16 wherein the sizes of the first area and the second area is based, at least in part, on an accuracy associated with the current location as reported by the location provider.

21. The method of claim 16, further comprising registering with the location provider to receive a notification of a significant change in the location of the device.

22. The method of claim 16, further comprising setting a timeout period so that a location of the device can be identified if the location provider fails to detect that the device has crossed the first boundary during that timeout period.

23. The method of claim 16, wherein the method is performed under control of an application that runs in background mode in which access to a satellite navigation system of the device is restricted by an operating system of the device.

24. The method of claim 23, further comprising, when the application enters a foreground mode in which access to the satellite navigation system is not restricted, identifying a current location of the device using the satellite navigation system.

25. The method of claim 16 wherein the size of the first area is based on speed of travel of the device.

* * * * *